United States Patent Office 3,558,702
Patented Jan. 26, 1971

3,558,702
METHOD FOR PURIFYING DIMETHYLFORMAMIDE RECOVERED FROM ACRYLONITRILE POLYMERIZATION PROCESSES IN THE COMMERCIAL PRODUCTION OF POLYACRYLONITRILE FIBERS AND YARNS
Alberto Pasin, Cesano Maderno, and Silvano Borgo, Chieti, Italy, assignors to SNIA Viscosa Società Nazionale Industria Applicazioni Viscosa S.p.A., an Italian company
No Drawing. Continuation-in-part of application Ser. No. 512,779, Dec. 9, 1965. This application Nov. 24, 1967, Ser. No. 685,277
The portion of the term of the patent subsequent to Oct. 14, 1986, has been disclaimed
Int. Cl. C07c 103/36
U.S. Cl. 260—561                9 Claims

ABSTRACT OF THE DISCLOSURE

A method is disclosed for purifying dimethylformamide, which has been obtained by recovery thereof in substantially non-aqueous condition from a process for spinning acrylonitrile polymers and copolymers to produce fibers and yarns, comprising treating the impure dimethylformamide by contacting it with two different ion-exchange resins which are insoluble in dimethylformamide, one of which is selected from the group of strongly acidic resins consisting of sulphonated styrene-divinyl benzene copolymers, and the other of which is selected from the group consisting of resins having quaternary ammonium groups in hydroxide form and of resins having aliphatic amino groups.

---

This application is a continuation-in-part of our application Serial No. 512,779, filed Dec. 9, 1965, now abandoned.

It is known that in industrial production of polyacrylonitrile fibres and yarns, the processes of polymerization of acrylonitrile in dimethylformamide are of particular importance and interest. These commercial processes have been particularly pointed out and disclosed in Italian Patent No. 5 01674 assigned to the assignee of this application.

The conversion of the polymer into a yarn, as is known, takes place within coagulating baths and possibly with dry processes, dimethylformamide being evolved. The latter compound, for quite understandable reasons, mainly of an economical nature, is recovered with a view to its reuse in polymerization processes. Dimethylformamide, as recovered or removed from, say, the coagulation baths should, as a rule, be purified since it unavoidably contains impurities, more particularly those due to the presence of salts and other integration and adjuvant agents in the baths. The conventional purification procedures as adopted by the known art are confined, in practice, to distillation methods.

In general, purification comes after distillation under atmospheric pressure, during the progress of which dimethylformamide is separated from the extractant, which generally is methylene chloride (e.g. as suggested by the British Patent No. 715,739), or from the methyl and ethyl esters of formic and acetic acid and mixtures thereof with methylene chloride (e.g. as disclosed in the U.S. Patent No. 3,086,050 assigned to the assignee of the present application).

By distillation under vacuum, dimethylformamide is at least partially purified so as to render its reuse in the acrylonitrile polymerization process possible. Distillation under vacuum must, however, of course, be confined within economically acceptable limits.

In actual practice, it is believed that these limits are observed when purification goes so far as to attain an impurity residue in the order of magnitude of 5–10 milliequivalents per litre. Such purification affords the possibility of reusing the dimethylformamide for acrylonitrile polymerization or copolymerization with a view to producing, as outlined above, acrylonitrile polymers and copolymers with results which up to now have been regarded as acceptable.

It has been ascertained by applicants that notably improved results are obtainable, more particularly as regards the priming times of the polymerizable compound (acrylonitrile) in dimethylformamide and the monomer conversion ratios, by adopting the purification method of the present application, more particularly for the purification of dimethylformamide as recovered from the production and spinning processes of acrylonitrile polymers and copolymers, said dimethylformamide being intended for subsequent reuse in the polymerization of monomers which are conducive to said polymers and copolymers. This dimethylformamide is in substantially non-aqueous condition.

More specifically, the present invention relates to a method of purification of dimethylformamide (DMF) in substantially non-aqueous condition, as recovered from the processes indicated above, characterized by the employment, in the particular industrial field as defined above, of particular resins which are insoluble in DMF and are endowed with a selective ion-exchange capability, so as to remove to a large degree those impurities which, according to applicants' experience, have proven to be the most significant hindrance against improvement of the priming times of polymerization and the conversion ratio of the monomer into polymer.

Stated another way, the present invention relates to a purification system for DMF employing ion-exchange resins, for freeing DMF from the impurities contained therein, and to the determination of particular ion-exchange resins capable of selective action with a view towards achieving the desired results in the particular purification environment considered.

It has been ascertained that the impurities contained in DMF as recovered from spinning processes of acrylonitrile polymer and copolymer fibres consist, in the main, of formic acid, acetic acid, and dimethylamine, both free and salified in the form of dimethylamine formate or acetate. Thus, both basic and acidic impurities can be present.

It has further been ascertained that both kinds of impurities have a bearing on the polymerization priming times and on the conversion ratio of monomer to polymer; and it has been also found that impurities of a basic nature have a particular influence on said parameters and also on the color of the final yarn.

Therefore, the method according to the invention essentially consists in the employment, in the purification of DMF, as recovered from the spinning of fibres of polymers and copolymers of acrylonitrile, where the DMF is intended for reuse in the polymerization of acrylonitrile, of resins which are insoluble in DMF, which are endowed with an adequate ion-exchange capability, which are strongly acidic in nature and belong to the class of sulphone group-containing styrenedivinylbenzene copolymers. These resins, which are adapted to exchange ions in organic solvents, have exhibited a particular activity in the specific field of DMF purification, said resins being insoluble in DMF.

According to a complementary feature of the invention, the removal of the acidic impurities, whenever required, is effected concurrently with the removal, which is of vital significance, of the basic impurities, by treatment through a bed of the strongly acidic resin mixed with a strongly basic resin, the latter also being insoluble in the DMF and belonging to the class of group consisting of resins having quaternary ammonium group in hydroxide form and of resins having aliphatic amino groups, adapted to exchange ions in organic solvents and insoluble in dimethylformamide.

Preferably the resin bed is between 60 and 100 centimeters thick. Preferably, also, the treatment of the impure DMF is effected at ambient temperature and at atmospheric pressure, and the DMF is brought into contact with the resins in the form of a downwardly flowing stream, and is carried out at a rate of flow of 5 to 10 liters per hour of DMF per liter of resins.

The advantageous effects and results of the invention have been ascertained and verified by experimental tests of purification treatments of dimethylformamide obtained from processes of recovery and extraction from coagulation baths in the spinning of acrylonitrile polymers and copolymers. Dimethylformamide has been extracted by employing conventional solvents and according to the techniques disclosed in the already cited U.S. Pat. No. 3,086,050 assigned to the assignee of this application. The extractant has been separated by conventional distillation processes under atmospheric pressure.

Several samples of DMF, having different degrees of impurities, have been used. A few samples have been passed through a strongly acidic resin so as to obtain decrease of the basic impurities, as selectively removed by the resin, down to values below 0.1 milliequivalents per liter. Other samples have been passed through a mixed bed of strongly acidic resin and of strongly basic resin so as to obtain a corresponding decrease of both the basic and the acidic impurities.

To verify the polymerization efficiency, polymerization tests have been carried out on several samples which had been treated and on other samples which did not undergo any treatment with ion-exchange resins.

Each sample has been treated under similar conditions. More particularly, to every 35 mls. of a sample have been added 45 mls. of distilled monomeric acrylonitrile having 99.4% of double bonds and containing 0.2 grs. of lauroyl peroxide as the catalyst. Each of the mixtures thus obtained has been individually introduced into a 120 ml. glass test tube and loaded for polymerization in a thermostat maintained at a constant temperature of 58° C. with a tolerance of +0.2° C.

The subject matters of the comparisons were:
(a) Polymerization priming times, starting from the loading in the thermostat.
(b) Percentage of converted monomer after 3 hrs. actual polymerization.
(c) Molecular weights of the polymers obtained.

The table below gives characteristic results of these tests.

TABLE 1

| DMF utilized [1] | Impurities, in milliequiv. per liter | | Priming tome, mins. | Percent monomer converted into polymer |
|---|---|---|---|---|
| | Acidic | Basic | | |
| (A) Conventionally recovered and purified (distillation in vacuo within economically acceptable limits) | 5.7 | 7.78 | 30 | 45.2 |
| (B) Recovered as above and passed through a strongly acidic resin | 5.7 | ([2]) | 5 | 49.5 |
| (C) Recovered as above and passed through a bed of strongly acidic and of strongly basic resins | ([2]) | ([2]) | 7 | 50 |

[1] In the polymerization of acrylonitrile for the production of acrylonitrile polymer or copolymer fibres.
[2] Less than 0.1.

The molecular weights of the obtained polymer are not appreciably modified.

It is, at any rate, clearly apparent that by using the process of the invention a remarkable decrease in the priming times is obtainable, along with a not negligible improvement in the percentage of converted monomer. The differences between the priming times and between the converted monomer percentages with reference to the sample A, in the two cases of employment of the samples B and C are virtually nil and lie anyhow within the experimental error range.

In any case, the effect of the removal of the basic impurities, whose important influence in polymerization processes employing recovered DMF, is clearly shown, is evident. The importance is thus apparent of having identified the particular class of ion-exchange resins which are the fundamentals of this invention in order to remove in a selective fashion the above indicated basic impurities.

The advantageous results of the invention have been confirmed also in connection with DMF having a higher purity rating, i.e. DMF which has been recovered from coagulation baths and which corresponds also to a DMF which has undergone a protracted distillation process exceeding the limits which are commonly deemed acceptable in the pertinent art. These facts have led to the conclusions set out in the following:

TABLE 2

| Grade of DMF used | Impurities | | Priming time, minutes | Percent conversion |
|---|---|---|---|---|
| | Acidic | Basic | | |
| (A') Not further treated | 3.58 | 2.93 | 16 | 45.3 |
| (B') Passed on strongly acidic resin | 2.58 | ([1]) | 4 | 49.7 |
| (C') Passed on bed of acidic and basic resins | ([1]) | ([1]) | 9 | 49.1 |

[1] Less than 0.1.

These results confirm those indicated in Table 1 above, more particularly as regards the detrimental bearing of the basic impurities.

Since treatment C' corresponds to a reduction of both the acidic and the basic impurities, the applicability of DMF cannot be evaluated merely on the basis of the absence of impurities, but, conversely, is a function, essentially, of the kind of resin adopted. Even though a chemist could be led to attribute the efficiency of the acidic resin to a particular adverse behavior of the basic impurities, this interpretation is not fully satisfactory, in that it could be conducive to attributing an actual beneficial effect to the acidic impurities, which is not conceivable at all.

Thus, applicants are satisfied by identifying and disclosing the process, the subject of the present invention, which is surprisingly efficient as to the recovery of dimethylformamide.

This identification of the impurities which are present is not deemed sufficient, however, since there are, very presumably, other unknown compounds having an adverse effect on polymerization even in very slight amounts; and it is very awkward to ascertain beforehand, on the mere basis of analytical results and without direct testing, whether or not the dimethylformamide is of a polymerization grade.

Probably, as regards these unknown impurities, the methods of distillation in vacuo within the economically acceptable range are inapt. Applicants have surprisingly ascertained that the treatment with acidic resins is sufficient for obtaining good results. Conversely, the treatment with basic resins proves to be of no advantage and is even slightly detrimental. This adverse result, however, is nearly completely overcome by adopting the simultaneous treatment with both kinds of resin. By this simultaneous treatment of the DMF, as employed by applicants, a purified solvent has been obtained which, when analyzed, has a greater purity than that treated with acidic resins only and has polymerization properties which are almost as good. The simultaneous use of both resins is therefore preferable since, on account of possible variations of the impurities and of the imperfect knowledge as to the nature of said impurities, this use can be regarded as a precautionary measure which assures the constancy of the results.

Having thus described our invention, what we claim is:

1. The process of purifying dimethylformamide, which contains at least one impurity of the group consisting of formic acid, acetic acid, dimethylamine, dimethylamine formate, and dimethylamine acetate, and which has been obtained by recovery thereof, in substantially anhydrous condition and by distillation methods from a coagulation and/or stretching bath used in wet-spinning acrylonitrile polymers and copolymers, which comprises
    treating the impure dimethylformamide with two different ion-exchange resins, both of which are insoluble in dimethylformamide,
    one of which is a strongly acidic resin selected from the group consisting of sulphonated styrene-divinylbenzene copolymers, and
    the other is a strongly basic copolymer resin of the quaternary ammonium type in the hydroxide ion form.

2. A method according to claim 1, wherein the purification step is carried out by passing dimethylformamide over a single bed comprising both the strongly acidic and the strongly basic resins.

3. A method according to claim 1, wherein the dimethylformamide is brought into contact with the resins in the form of a downwardly flowing liquid stream.

4. A method according to claim 1, wherein the treatment of impure dimethylformamide with the ion-exchange resins takes place at ambient temperature.

5. A method according to claim 1, wherein said treatment of impure dimethylformamide is carried out at atmospheric pressure.

6. A method according to claim 3 wherein said treatment is carried out at a rate of flow of 5 to 10 liters per hour of dimethylformamide per liter of resins.

7. A method according to claim 2, wherein the thickness of the resin bed is between 60 and 100 centimeters.

8. The method according to claim 1, wherein the dimethylformamide to be purified is obtained by first extracting it with methylene chloride or with mixtures of methylene chloride and methyl and ethyl esters of formic and acetic acids from the coagulating baths containing the same.

9. The method according to claim 1, wherein the dimethylformamide to be purified is obtained from coagulation baths, containing the salts of wet spinning.

References Cited
UNITED STATES PATENTS 3,294,651　12/1966　Pasin _____ 203—39
3,051,741　8/1962　Marzolph et al. ____ 260—465.4

NICHOLAS S. RIZZO, Primary Examiner

J. A. NARCAVAGE, Assistant Examiner

U.S. Cl. X.R.

260—88.7, 465; 264—37, 179